3,682,795
SPUTTER COATING OF RAZOR BLADES WITH A BETA-TUNGSTEN TYPE ALLOY
Irwin W. Fischbein, Canton, Ben H. Alexander, Brookline, and Aiyaswami Sastri, Brighton, Mass., assignors to The Gillette Company, Boston, Mass.
Filed July 28, 1969, Ser. No. 845,142
Int. Cl. C23c 15/00
U.S. Cl. 204—192
3 Claims

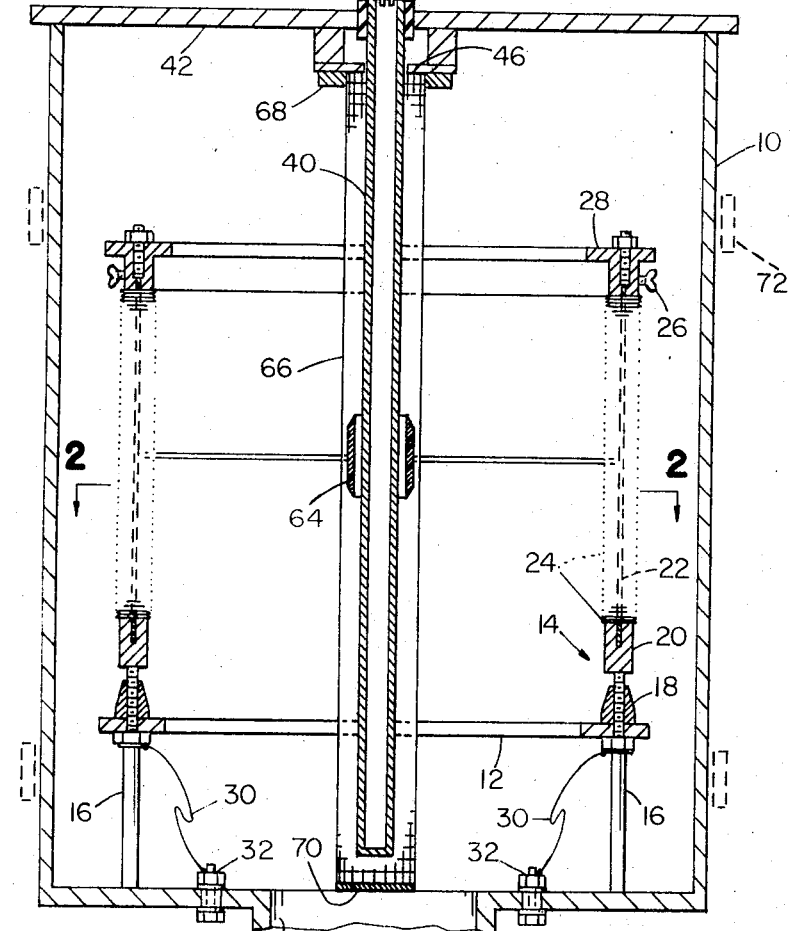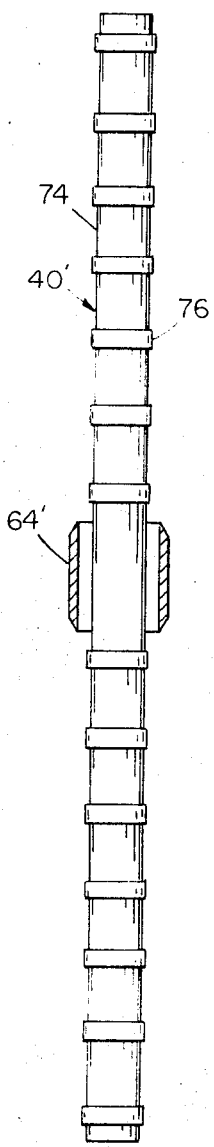

ABSTRACT OF THE DISCLOSURE

A razor blade has a film (in the range of 100–400 A. in thickness) of an alloy of a noble metal and a strengthening metal on its cutting edge, this noble metal alloy film being at least as hard as the underlying blade metal and resistant to corrosion by a concentrated hydrochloric acid.

SUMMARY OF INVENTION

This invention relates to improved razor blades, either single edged or double edged, and to improved methods and apparatus for manufacturing such blades.

Razor blades are generally made from either carbon steel sheet or hardenable corrosion resistant steel sheet that is from about 0.0015 to about 0.015 inch thick. The sheet steel is hardened by a suitable heat treating process and then one or both edges are sharpened to provide wedge shaped cutting edges by a series of precision grinding and/or honing operations, the cutting edges having an included solid angle between 14–35°, a preferred wedge angle being between about 18–26°. The faces or sides of such cutting edges extend back from the ultimate edge a distance up to as much as 0.1 inch or even more and may comprise two or more "facets" formed by successive grinding or honing operations and intersecting each other along zones generally parallel to the ultimate edge. The final facet, that is the facet immediately adjacent the ultimate edge, may have a width of as little as 0.0003 inch or even less, while the thickness of the ultimate edge is generally less than 6000 A. and preferably less than 2500 A. Due to its thinness, the ultimate edge is extremely susceptible to breakdown by mechanical failure and corrosion.

In recent years the shaving properties of razor blades have been substantially enhanced by the application to the cutting edge of a polymeric coating such as the fluorocarbons disclosed in Fischbein U.S. Pat. No. 3,071,856. In adhering such fluorocarbon coatings to blade edges, it is desirable to cure or heat the coatings by exposing the blades to elevated temperatures, e.g., 550° F. to 800° F. Such temperatures have a softening effect on both the underlying blade metal and any corrosion resisting metal coating on the blade edge which softening adversely effects the shaving properties of the blades. Many manufacturers found it desirable to resort to edge strengthening techniques such as increasing the blade angle, e.g. to angles greater than 26°, in order to compensate for the softening effect and provide the edge with adequate strength and life. It has also been proposed to apply a coating of a corrosion resistant metal such as gold, rhodium or chromium to the sharpened edge of a razor blade by evaporation or sputtering. However, noble metals have not been satisfactory as intermediate layers between the base metal and the polymeric coatings as they tend to break away from the shaving edges under the abrasion forces encountered in shaving. Such failure carries away the overlying polymeric shave facilitating coating and this tendency renders such blades commercially unsatisfactory.

It is a general object of this invention to provide novel razor blades which have improved mechanical properties and especially improved corrosion resistance.

A more specific object of the present invention is to provide blades with a metal film having improved corrosion resisting properties which is firmly adherent to the blade edge surfaces and provides a sturdy base for polymeric coatings which are formed at elevated temperatures.

A still further object of the invention is to provide novel and improved blades which possess superior shaving properties.

In general, the above objects are achieved by providing blades having a thin metal film of an alloy of a noble metal (platinum, osmium, iridium, palladium, rhodium, ruthenium or gold) and a strengthening metal selected from the class consisting of chromium, titanium, manganese, niobium, molybdenum, tantalum, and tungsten on their cutting edges. Particularly advantageous alloys are those alloy compositions that form the compound $M_3N$ [$\beta$-tungsten type structure] where M is selected from the class consisting of chromium, molybdenum, niobium and titanium and N is a noble metal, and alloy compositions around those compounds, that is, within about ±5 weight percent of these compounds. In the case of platinum-chromium alloys, a preferred range of platinum content is 15–29 atomic percent and particularly advantageous results are obtained with a platinum content of 20–27 atomic percent. The edges of razor blades having alloy films on them in accordance with the invention exhibited no sign of corrosion of the sharpened coated edges after immersion in concentrated hydrochloric acid for one minute. The alloy film in accordance with the invention is at least as hard as the underlying blade metal and should not exceed 600 A. in thickness, a preferable range being 50–500 A. and the best results being obtained with a thickness range of 100–400 A. This noble metal alloy film should be continuous and of substantially uniform thickness. Further, from the standpoint of commercial practicability, this film should be applied with process and apparatus that permits manufacture of large quantities of razor blades with a minimum of additional processing steps.

Accordingly, a further object of the invention is to provide novel and improved methods and apparatus for placing a film of a noble metal alloy having superior corrosion resistant properties on the sharpened edges of razor blades with controlled uniformity.

Another object of the invention is to provide novel and improved apparatus for placing a film of improved corrosion resistant alloy on the sharpened edges of razor blades in a mass production process and in a manner that does not impair the quality of the sharpened edge.

Still another object of the invention is to provide a novel and improved blade treatment system for cleaning the sharpened edges of razor blades and then applying a thin film of a noble metal alloy that is at least as hard as the underlying blade metal to the sharpened edges of a multiplicity of razor blades in a volume production operation.

Another object of the invention is to provide methods and apparatus for producing razor blades, in commercial quantities, which include an alloy film that increases the shaving life of the razor blades without impairing the first shave qualities of those razor blades.

A blade treatment system in accordance with the invention includes an evacuable chamber having disposed in it a structure for receiving a stack of razor blades, the blades in the stack being disposed in face to face relationship with their sharpened edges in alignment. Also disposed within the chamber is a source of metal separated into two elongated sections. The two sections of the source extend along a line parallel to the exposure axis of a stack of blade edges. Where a noble metal alloy is to be deposited, each section of the source of metal includes a noble metal and a strengthening metal in metallurgically separate form from the noble metal. This source of metal may take various forms, for example it may be a sintered compact of the metals of which the alloy is to be formed; or an assembly of one or more segments of the strengthening metal component of the alloy, to which equally spaced segments of the noble metal component of the alloy are secured. In processing the blades, after the blade edges are cleaned, the metal source is energized in a reduced pressure gaseous environment forming on the blade edges a thin film of the noble metal alloy of the separate metals of the source. A preferred method of forming the alloy deposit on the blade edges is to subject the composite metal source to an ion bombardment process to transfer metal atoms to the sharpened blade edges.

This method and apparatus provides a particular convenient method for applying a thin film of noble metal alloy to the blade edges, which thin film does not have an adverse effect on shaving characteristics of the blade and which does not require further mechanical working of the blade edge area to provide satisfactory first shave quality. The invention provides improved razor blades with blade stock formed from a wide range of blade steels. Specific steel compositions with which the invention may be practiced include the following:

COMPOSITION IN PERCENT

| C | Cr | Mo | Si | Ni |
|---|---|---|---|---|
| 1.25 | .2 |  | .2 |  |
| 1.00 | 6.0 |  | 1.4 |  |
| .96 | 13.9 |  | .3 |  |
| .65 | 10.5 | 1.0 | .3 |  |
| .58 | 14.0 |  | .3 |  |
| .40 | 13.5 | 1.25 | .3 |  |
| .09 | 17.0 | .70 | 1.2 | 8.0 |

The preferred metal alloy coatings on the edges of the blades of the invention are significantly harder than the blade bodies and have hardnesses of up to about 1200 DPHN (using a 3 kg. equivalent load). The blade edge alloy coatings remain harder than prior art commercial blades after the blades are subjected to polymer curing temperatures in the range of 550–800° F. and have excellent corrosion resistance.

In preferred embodiments of the invention, the alloy coated cutting edges of the blades are coated with polymeric coatings which further enhance their shaving comfort and ease. Suitable examples of such coatings are the organosiloxane gels set forth in U.S. Pat. No. 2,937,976 to Leon E. Granahan, Meyer J. Shnitzler and Edward M. Tuckerman, the polymeric hydrocarbons, e.g., polyethylene, set forth in U.S. Pat. 3,071,858 to Harvey Alter and the polymeric fluorocarbons set forth in U.S. Pat. No. 3,071,856 to Irwin W. Fischbein. As pointed out above, the blades of the present invention, because of their good mechanical and corrosion resistance qualities, are especially useful with polymeric coatings such as the polymeric fluorocarbons which are generally cured on the edges at elevated temperatures, e.g., between about 550° F. to about 800° F. The blades disclosed herein may be sharpened to the more desired edge angles, that is between 18–26°, and still have sufficient strength, despite being subjected to elevated temperatures, to provide the cutting edge with a long use life. In preferred embodiments of the present invention, the blades are sharpened to an edge angle between 20 and about 24°, all such edge angles disclosed herein being measured at a distance at about 1.5 microns distance from the ultimate edge.

Other objects, features and advantages of the invention will be seen as the following description of particular embodiments of the invention progresses, in conjunction with the drawings, in which:

FIG. 1 is a sectional view of a form of apparatus employed in the invention;

FIG. 2 is a sectional view of the apparatus shown in FIG. 1, taken along the line 2—2 of FIG. 1; and FIG. 3 is an elevational view of an alternate form of target structure employed in the apparatus shown in FIG. 1.

DESCRIPTION OF PARTICULAR EMBODIMENTS

The apparatus shown in FIG. 1 includes a stainless steel chamber 10 eighteen inches in diameter and thirty-two inches high. The base of the chamber is coupled through port 11 to a suitable vacuum system (not shown). A butterfly valve that has an aperture one inch in diameter is disposed downstream of port 11 and may be moved to closed position during sputtering to reduce back streaming of the diffusion pump. Mounted in chamber 10 on ring 12 are eighteen blade stack support structures 14. Ring 12 is supported from the base of chamber 10 by six post structures 16. Each blade stack support structure 14 includes an insulator structure 18 which isolates the support structure from ring 12 and a base structure 20 on insulator 18 that includes a recess for receiving the lower end of a relatively rigid elongated blade aligning leaf of knife 22 on which a stack of razor blades 24 is positioned. A clamping structure 26 at the upper end of knife 22 secured a stack of blades 24 in position on the knife and in turn is secured to an upper aligning ring 28. An electrical connection to the blade stack 24 is made via conductor 30 and feed through connection 32 in the base of chamber 10. In a typical processing run of double edged blades in this apparatus, each stack is twelve inches long and contains three thousand blades while in a typical processing run of single edge injector blades, each stack contains twelve hundred blades. The sharpened edges of the blades are 6¾ inches from the axis of chamber 10. Other support structures, such as those for coils of blade strip of the type disclosed in co-pending application Ser. No. 693,529, may be substituted for these support structures.

Also mounted within chamber 10 coaxially with the chamber axis is a target rod 40 that includes a noble metal and a second metal. Rod 40 is suspended from chamber top plate 42 by insulator structure 44. A water cooled dark space shield 46, also suspended from top plate 42, is provided to protect insulator 44. The exposed length of target rod 40 below shield 46 is twenty-nine inches in one embodiment and twenty-eight inches in a second embodiment and that exposed length is positioned symmetrically with respect to the stacks of razor blades 24. In these embodiments the rod 40 is 1¼ inches in diameter and has a wall thickness of ¼ inch. Coolant from a suitable source 48 is flowed through rod 40 for cooling purposes. Connected to the target rod 40 is a matching network 50 that includes fixed capacitor 52, an inductor 54 (adjustable over the range 0–5 microhenries) and a capacitor 56 (adjustable over the range 0–1000 picofarads), the matching network being connected to an RF (13.56 mHz.) voltage supply 60 via shielded conductor 62.

A cylindrical shield 64 that has an inner diameter of two inches, a wall thickness of ¼ inch, and a length of 2¾ inches and that has its upper and lower ends tapered is positioned symmetrically with respect to the blade stacks 24, that is with its top edge at a distance of 13⅛ inches from dark space shield 46 with the twenty-nine inch target rod 40. This cylinder 64 shields rod 40 over an effective length of three inches and a more uniform deposition of material on the edges of the blades 24 results than if shield 64 is omitted. A stainless steel wire mesh cylinder 66, 3¼ inches in diameter with ⅛ inch apertures, supports shield 64 and is suspended from dark space shield 46 by flange 68 that is solidly bolted to shield 46. The lower end of mesh cylinder 66 is closed by a stainless steel plate 70. Two Helmholtz coils diagrammatically indicated at 72 surround chamber 10, one above and one below the blade stacks. These coils, when energized, create a vertical magnetic field of 2000 gauss magnitude in the chamber 10. The use of mesh cylinder 66 and the magnetic field increases the metal deposition rate and reduces secondary electron bombardment of the blades.

The target 40 may take a variety of forms. In one form the target may be a sintered compact of osmium and chromium. In a second form as indicated in FIG. 3, the target 40' is formed of alternating exposed sections of chromium 74, and platinum 76. In one embodiment, strips of platinum ribbon, each strip being 0.002 inch thick, ½ inch wide and four inches long, are wrapped around a chromium rod to form rings 76 and are spot welded to the rod. The rings 76 are equally spaced from one another on either side of the three-inch long zone shielded by cylinder 64'. In the illustrated embodiment, the exposed surface area of this target assembly is 27% platinum and 73% chromium. In another embodiment cylindrical sections of a noble metal and a strengthening metal are soldered together in alternating series to form the target 40.

In operation of this apparatus, the sharpened blades 24 in stacks, are placed in chamber 10 on knives 22. The chamber is evacuated and argon at a pressure in the range of 10 microns is placed in the chamber. The blades are then subjected to RF or DC cleaning. After cleaning, the chamber is evacuated and argon at pressure of 5–8 microns is placed in the chamber. With the blade stacks and chamber 10 grounded, a potential is applied from power supply 60 to target 40. Argon ions are produced which bombard target 40 and release atoms of the two metals. The released atoms are deposited on exposed surfaces, including the sharpened blade edges. This operation with an elongated target rod and plural blade stacks forms an easily controlled noble metal alloy coating uniformly on the blade edges to thicknesses of less than 600 A. The alloy composition is a direct function of the exposed surfaces of the metals in the target rod. Thus, with the specific target rod configuration shown in FIG. 3 an alloy composition close to the platinum-chromium compound $Cr_3Pt$ is deposited, the alloy having about 58 weight percent (27 atomic percent) platinum. Deposition rates are a function of applied power. For example, an input power of two kilowatts provides a deposition rate of 50 A./minute while an input power of five kilowatts provides a deposition rate of 150 A./minute.

As a specific example, sixty thousand stainless steel razor blades having the following composition:

| | Percent |
|---|---|
| Carbon | .54–.62 |
| Chromium | 13.5–14.5 |
| Manganese | .20–.50 |
| Silicon | .20–.50 |
| Phosphorus, max. | .025 |
| Sulphur, max. | .020 |
| Nickel, max. | .50 |
| Iron | Remainder | were sharpened to an included solid angle of 24.8" and placed on eighteen knives 22.

The pressure in chamber 10 was reduced to 0.1 micron and a discharge sustaining atmosphere of argon was then bled into the chamber to increase the pressure to ten microns. A direct current glow discharge was initiated in this argon atmosphere at a voltage of 1500 volts and a current of 975 milliamperes and maintained for seven minutes. The argon gas pressure in the system was then reduced to about 5 microns of mercury and the blade stacks 24 connected to ground. 3.5 kilowatts of RF power at a frequency of 13.56 magacycles and about 6000 volts were applied to rod 40' for five minutes. The reflected power was maintained between 50 and 60 watts. The resulting platinum-chromium alloy coating had a hardness of about 800 DPHN and a thickness of about 350 A. and extended along the entire cutting edge of the blades and back along the final facet for a length of at least 0.001 inch. A coating of polytetrafluoroethylene telomer was then applied to the edges of the blades in accordance with the teaching in co-pending application Ser. No. 384,805, filed July 23, 1964 in the name of Irwin W. Fischbein. This processing involved heating the blades to a temperature preferably in the range of 590–806° F. and provided on the cutting edges of the razor blades an adherent coating of solid fluorocarbon polymer. After heating the equivalent hardness of the edge metal (the composite of the thin alloy film and the underlying blade metal) was 700 DPHN. These blades exhibited excellent shaving properties and long shaving life.

As another example, a target 40' had six inches of platinum (12, ½ inch wide strips) spot welded to it. Blades of the same type as in the first example were cleaned with a DC glow discharge in argon gas in the same manner as in that example and then a platinum-chromium alloy was formed on the blade edges by sputtering for duration of four minutes employing a reflected power of 110–120 watts. The resulting noble metal alloy coating (about twenty-three atomic percent platinum) had a thickness of about 250 A. and a hardness of about 1100 DPHN. The blades were then coated with a fluorocarbon telomer in accordance with the teachings in patent application Ser. No. 384,805. After heating the equivalent hardness of the edge metal was 700 DPHN. The blades processed in this manner exhibited excellent shaving properties and long shaving life.

As a third example, the target rod 40' had five inches of platinum (10, ½ inch wide strips) spot welded to it. Blades of the same type as in the first example were cleaned with a DC glow discharge in argon gas in the same manner as in that example and then a platinum-chromium alloy was formed on the blade edges by sputtering for a duration of five minutes employing an applied power of 3.5 kilowatts and a reflected power of 50–70 watts. The resulting noble metal alloy coating (about 21 atomic percent platinum) had a thickness of about 350 A. and a hardness of about 1050 DPHN. The blades were then coated with a fluorocarbon telomer in accordance with the teachings in patent application Ser. No. 384,805. After heating the equivalent hardness of the edge metal was 650 DPHN. The blades processed in this manner exhibited excellent shaving properties and long shaving life.

As a fourth example, employing a similar group of blades, six tungsten coils plated with palladium were mounted in a chamber of the type disclosed in co-pending application Ser. No. 693,529, filed Dec. 26, 1967. With argon in the chamber at a pressure of 10 microns, a glow discharge was initiated at a voltage of 1600 volts and a current flow of 975 milliamperes for seven minutes. The argon flow was then terminated and the pressure in the chamber reduced to 0.1 micron. The tungsten-palladium coils were then energized with an electrical potential of twelve volts and an electric current of 200 amperes for fifteen minutes to vaporize both palladium and tungsten and deposit on the blades a palladium-tungsten alloy that contained 50% palladium and 50% tungsten by weight. The coated edges had an equivalent hardness of 690 DPHN and after application of the fluorocarbon telomer as in the other examples the equivalent hardness of the edge metal was 650 DPHN. The blades exhibited excellent shaving properties.

As still another example, a pure chromium disc 6 inches in diameter and ¼ inch thick had spot welded to its surface squares of pure platinum foil 1 cm. on a side and 0.002 inch thick. These foil squares were spaced on the surface so that 27% of the chromium surface was covered with platinum. A 4½ inch stack of stainless steel blades was placed on a five inch diameter aluminum disc in an RF sputtering unit. (This apparatus may also be used for processing a coiled stack of blade strip with the strip placed on the aluminum disc so that the sharpened edges of the strip are aligned with one another and define an exposure axis.) The platinum-chromium disc surface was disposed parallel to the blade edges at a distance of 2½ inches. The RF power could be fed to the plate supporting the blades or to the platinum-chromium plate above the blade stack. The pressure in the vacuum chamber was brought to the ten microns of mercury range at which time pure argon gas was bled into the chamber to a pressure of ten microns of mercury. The aluminum disc and blades were then cleaned for two minutes at 0.2 kw. of RF power at 13.56 megacycles and about 6000 volts. The platinum-chromium target was covered by a metal shield during this cleaning step. The shield was then placed so that the blades were shielded and the platinum-chromium target plate was cleaned with an applied power of 0.4 kw. for one minute while maintaining ten microns of mercury pressure of argon gas. The shield was then removed from between the blades and the platinum-chromium target. Sputtering (ion bombardment) of the target now proceeded at 0.4 kilowatt for one minute and forty seconds. The edges of the blades facing the target received a platinum-chromium alloy coating consisting of 58 weight percent platinum and 42 weight percent chromium to a thickness of about 250 A. and a hardness of about 800 DPHN. These blades when coated with a thin film of a PTFE telomer in the usual manner exhibited excellent shaving properties.

As a further example, a titanium disc ⅛ inch thick and three inches in diameter (appropriate dark space shielding produces an effective disc diameter of 2⅝ inches) had spot welded to its surface squares of pure platinum foil ½ cm. on a side and 0.010 inch thick. These foil squares were placed on the surface of the disc so that 8% of the titanium surface was covered with platinum. A stack of one hundred stainless steel blades was placed on a water cooled five inch diameter aluminum disc in an RF sputtering unit. The platinum-titanium disc surface was disposed parallel to the blade edges at a distance of 2½ inches. A sputter was interposed midway between the blades and the platinum-titanium disc. An environment of argon gas at a pressure of 10 microns of mercury was placed in the vacuum chamber. The argon disc and blades were then cleaned for ten minutes at 0.2 kilowatt of RF power at 13.56 mHz. and about six thousand volts, during which interval the platinum-titanium target was shielded by the shutter. The target was then presputtered with an applied power of 0.8 kilowatt for ten minutes while maintaining the pressure of the argon gas in the chamber at ten microns of mercury. The shutter was then removed from between the blades and platinum-titanium target and a platinum-titanium alloy was deposited on the blade edges by sputtering at 0.8 kilowatt applied power for two minutes. The coating was a platinum-titanium alloy consisting of twenty-four atomic percent platinum and seventy-six atomic percent titanium and had a thickness of about 350 A. and was harder than the underlying blade metal. These blades, when coated with a thin film of PTFE telomer in the usual manner, exhibited excellent shaving properties and long shaving life.

As still another example, the Helmholtz coils 72 and mesh cylinder 66 (which were not used in the previously described examples) and a target rod 40 twenty-eight inches in effective length formed of alternating cylinders of platinum and chromium so that the rod had a uniform diameter along its length were employed. The exposed surface area of the target assembly was 22% platinum and 78% chromium. Fifty-four thousand stainless steel double edged blades of the same type as in the first example were placed on rotatably mounted blade stack support structures 14 in chamber 10.

The pressure in chamber 10 was reduced to 0.1 micron and a discharge sustaining atmosphere of argon was then bled into the chamber to increase the pressure to ten microns. A direct current glow discharge was initiated in this argon atmosphere at a voltage of 1600 volts and a current of 1100 milliampers and maintained for three and one-half minutes. Four kilowatts of RF power at a frequency of 13.56 megacycles and about 6000 volts was applied to rod 40 with zero reflected power for three minutes. The RF power was applied ten seconds before application of the DC power was entirely terminated and was increased gradually to four kilowatts as the DC power was being reduced. The Helmholtz coils 72 were energized at the same time that the RF power was initially applied. After the end of the three minute sputtering interval the blade stacks were turned and the above described cleaning and sputtering steps were repeated. The resulting platinum-chromium alloy coating had a platinum content of about 29 atomic percent, a hardness of about 800 DPHN and a thickness of about 300 A. and extended along the entire cutting edge of the blades and back along the final facet for a length of at least 0.001 inch. These blades, when coated with a thin film of PTFE telomer in the usual manner, exhibited excellent shaving properties and long shaving life.

While particular embodiments of the invention have been shown and described, various modifications thereof will be apparent to those skilled in the art and therefore it is not intended that the invention be limited to the disclosed embodiments or to details thereof and departures may be made therefrom within the spirit and scope of the invention.

What is claimed is:

1. A method of forming a $\beta$ tungsten type alloy on the sharpened edges of razor blades comprising the steps of positioning a multiplicity of razor blades in a plurality of stacks with the bodies of the blades in each stack in contact with one another and the sharpened edges of the blades aligned with one another, the razor blade stacks being arranged in a circle with the axes of said stacks parallel to one another, providing an elongated target rod having a noble metal component and a strengthening metal component separate from said nobel metal component, said strengthening metal component being selected from the class consisting of chromium, titanium, manganese, niobium, molybdenum, tantalum and tungsten, disposing said target rod in a position parallel to and equidistant from the axes of said razor blade stacks, subjecting said target rod to an ion bombardment process to transfer noble metal atoms and strengthening metal atoms from said target rod to said sharpened blade edges to form a $\beta$ tungsten type noble metal alloy film having a thickness of less than 600 angstroms on the sharpened edges of said razor blades, and applying a shave facilitating coating on said noble metal alloy film on the sharpened edges of said razor blades.

2. The method of claim 1 wherein the thickness of said deposited metal film is in the range of 100–400 A.

3. The method of claim 2 wherein the alloy of said deposited film is platinum-chromium.

References Cited

UNITED STATES PATENTS

| 3,480,483 | 11/1969 | Wilkinson | 204—192 |
| 3,562,140 | 2/1971 | Skinner et al. | 204—192 |

FOREIGN PATENTS

| 457,378 | 6/1949 | Canada | 204—192 |

JOHN H. MACK, Primary Examiner

S. S. KANTER, Assistant Examiner

U.S. Cl. X.R.

29—196; 301—346, 53